US011511693B2

(12) United States Patent
Moseley et al.

(10) Patent No.: US 11,511,693 B2
(45) Date of Patent: Nov. 29, 2022

(54) BIOMETRIC FREQUENCY

(71) Applicant: Tactual Labs Co., New York, NY (US)

(72) Inventors: Braon Moseley, Round Rock, TX (US); Darren Leigh, Leesburg, VA (US)

(73) Assignee: Tactual Labs Co., New York, NY (US)

( * ) Notice: Subject to any disclaimer, the term of this patent is extended or adjusted under 35 U.S.C. 154(b) by 525 days.

(21) Appl. No.: 16/574,310

(22) Filed: Sep. 18, 2019

(65) Prior Publication Data

US 2020/0086817 A1 Mar. 19, 2020

Related U.S. Application Data

(60) Provisional application No. 62/733,041, filed on Sep. 18, 2018.

(51) Int. Cl.
| | |
|---|---|
| *B60R 21/015* | (2006.01) |
| *G06N 20/00* | (2019.01) |
| *H04B 13/00* | (2006.01) |
| *H04J 13/00* | (2011.01) |
| *G06V 40/10* | (2022.01) |

(52) U.S. Cl.
CPC .. *B60R 21/01556* (2014.10); *B60R 21/01534* (2014.10); *G06N 20/00* (2019.01); *G06V 40/103* (2022.01); *H04B 13/005* (2013.01); *H04J 13/004* (2013.01)

(58) Field of Classification Search
CPC ........ B60R 21/01556; B60R 21/01534; G06K 9/00369; G06K 9/00362; G06K 9/209; G06K 9/00832; G06N 20/00; H04B 13/005; H04J 13/004; G06F 3/015; G06F 3/0416; G06F 3/011; G06F 3/044; G06F 2203/04104; H04L 27/26
See application file for complete search history.

(56) References Cited

U.S. PATENT DOCUMENTS

| | | | |
|---|---|---|---|
| 2014/0275928 A1* | 9/2014 | Acquista | A61N 1/36585 600/382 |
| 2017/0313248 A1* | 11/2017 | Kothari | B60R 1/00 |
| 2018/0330173 A1* | 11/2018 | Zhu | B60K 31/0058 |
| 2019/0050618 A1* | 2/2019 | Khuri-Yakub | H04M 1/03 |
| 2020/0033869 A1* | 1/2020 | Palanisamy | G06N 3/006 |
| 2020/0090045 A1* | 3/2020 | Baker | G06N 3/084 |

FOREIGN PATENT DOCUMENTS

CN 201773434 U * 3/2011

OTHER PUBLICATIONS

Sahdev_2017 (Year: 2017).*
English Translation_CN201773434U (Year: 2017).*

* cited by examiner

*Primary Examiner* — Peter D Nolan
*Assistant Examiner* — Ashley L Redhead, Jr.
(74) *Attorney, Agent, or Firm* — Adam Landa

(57) ABSTRACT

A plurality of frequency orthogonal signals are transmitted into a person. At least one of the plurality of frequency orthogonal signals is received at a receiving antenna or conductor. The received signal is measured. Characteristics of the received signal are used to establish a result related to that person.

18 Claims, 3 Drawing Sheets

BIOMETRIC FREQUENCY

This application claims the benefit of U.S. Provisional Patent Application Ser. No. 62/733,041 filed Sep. 18, 2018, the contents of which are hereby incorporated herein by reference. This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The disclosed apparatus and methods relate to the field of sensing, and in particular to sensing used to provide a result correlated to an individual.

BRIEF DESCRIPTION OF THE DRAWINGS

The foregoing and other objects, features, and advantages of the disclosure will be apparent from the following more particular description of embodiments as illustrated in the accompanying drawings in which reference characters refer to the same parts throughout the various views. The drawings are not necessarily to scale, emphasis instead being placed upon illustrating principles of the disclosed embodiments.

DETAILED DESCRIPTION

Figure 1:
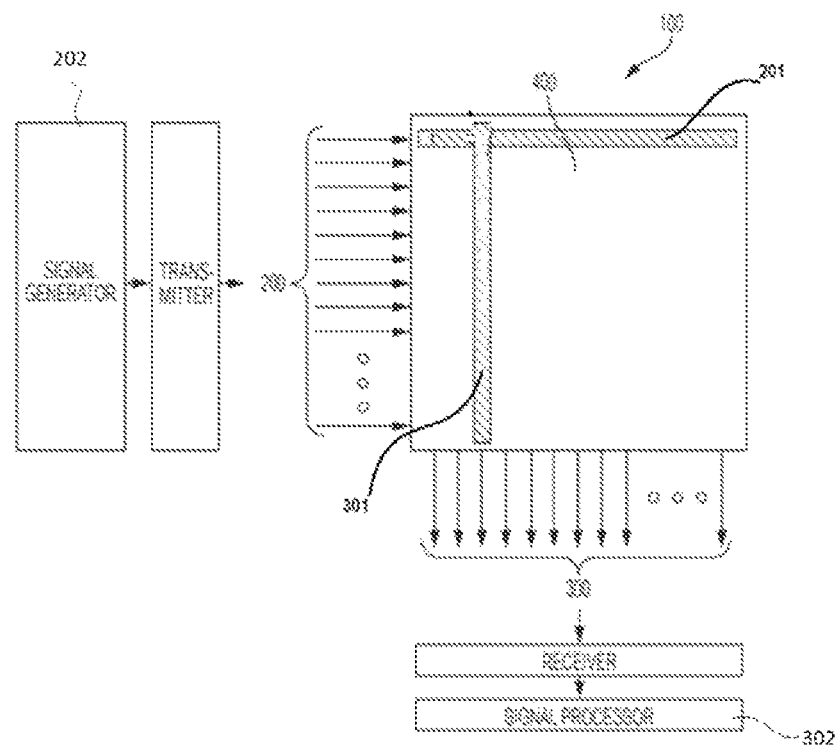
FIG. 1 shows a diagram of the sensor.

The present application contemplates various embodiments of sensors designed to detect and utilize infused signals. The sensor configurations are suited for use with frequency-orthogonal signaling techniques (see, e.g., U.S. Pat. Nos. 9,019,224 and 9,529,476, and 9,811,214, all of which are hereby incorporated herein by reference). The sensor configurations discussed herein may be used with other signal techniques including scanning or time division techniques, and/or code division techniques. It is pertinent to note that the sensors described and illustrated herein are also suitable for use in connection with signal infusion (also referred to as signal injection) techniques and apparatuses.

The presently disclosed systems and methods involve principles related to and for designing, manufacturing and using capacitive based sensors, and particularly capacitive based sensors that employ a multiplexing scheme based on orthogonal signaling such as but not limited to frequency-division multiplexing (FDM), code-division multiplexing (CDM), or a hybrid modulation technique that combines both FDM and CDM methods. References to frequency herein could also refer to other orthogonal signal bases. As such, this application incorporates by reference Applicant's prior U.S. Pat. No. 9,019,224, entitled "Low-Latency Touch Sensitive Device" and U.S. Pat. No. 9,158,411 entitled "Fast Multi-Touch Post Processing." These applications contemplate FDM, CDM, or FDM/CDM hybrid touch sensors which may be used in connection with the presently disclosed sensors. In such sensors, interactions are sensed when a signal from a row is coupled (increased) or decoupled (decreased) to a column conductor and the result received on that column. By sequentially exciting the row conductors and measuring the coupling of the excitation signal at the column conductors, a heatmap reflecting capacitance changes, and thus proximity, can be created.

This application also employs principles used in fast multi-touch sensors and other innovative interfaces disclosed in the following: U.S. Pat. Nos. 9,933,880; 9,019,224; 9,811,214; 9,804,721; 9,710,113; and 9,158,411. Familiarity with the disclosure, concepts and nomenclature within these patents is presumed. The entire disclosure of those patents and the applications incorporated therein by reference are incorporated herein by reference. This application also employs principles used in fast multi-touch sensors and other interfaces disclosed in the following: U.S. Pat. Nos. 10,191,579; 10,386,975; 10,175,772; U.S. Patent Publication Nos. 2017/0371487; 2018/0164921; 2018/0267599; 2019/0042032; 2018/0306568; U.S. Patent Provisional Application Nos. 62/473,908; 62/488,753; 62/533,405; 62/540,458; 62/575,005; 62/588,148; 62/588,267; 62/621,117; 62/619,656; 62/657,120; 62/657,270 and PCT Publication No. PCT/US2017/050547. Familiarity with the disclosure, concepts and nomenclature within these patents is presumed. The entire disclosures of those patents and the applications incorporated therein by reference are incorporated herein by reference.

As used herein, and especially within the claims, ordinal terms such as first and second are not intended, in and of themselves, to imply sequence, time or uniqueness, but rather, are used to distinguish one claimed construct from another. In some uses where the context dictates, these terms may imply that the first and second are unique. For example, where an event occurs at a first time, and another event occurs at a second time, there is no intended implication that the first time occurs before the second time, after the second time or simultaneously with the second time. However, where the further limitation that the second time is after the first time is presented in the claim, the context would require reading the first time and the second time to be unique times. Similarly, where the context so dictates or permits, ordinal terms are intended to be broadly construed so that the two identified claim constructs can be of the same characteristic or of different characteristic. Thus, for example, a first and a second frequency, absent further limitation, could be the same frequency, e.g., the first frequency being 10 Mhz and the second frequency being 10 Mhz; or could be different frequencies, e.g., the first frequency being 10 Mhz and the second frequency being 11 Mhz. Context may dictate otherwise, for example, where a first and a second frequency are further limited to being frequency-orthogonal to each other, in which case, they could not be the same frequency.

Certain principles of a fast multi-touch (FMT) sensor have been disclosed in patent applications discussed above. Orthogonal signals are transmitted into a plurality of transmitting conductors (or antennas) and information is received by receivers attached to a plurality of receiving conductors (or antennas), the signal is then analyzed by a signal processor to identify touch events. The transmitting conductors and receiving conductors may be organized in a variety of configurations, including, e.g., a matrix where the crossing points form nodes, and interactions are detected at those nodes by processing of the received signals. In an embodiment where the orthogonal signals are frequency orthogonal, spacing between the orthogonal frequencies, $\Delta f$, is at least the reciprocal of the measurement period $\tau$, the measurement period $\tau$ being equal to the period during which the column conductors are sampled. Thus, in an embodiment, a column conductor may be measured for one millisecond ($\tau$) using frequency spacing ($\Delta f$) of one kilohertz (i.e., $\Delta f = 1/\tau$).

In an embodiment, the signal processor of a mixed signal integrated circuit (or a downstream component or software) is adapted to determine at least one value representing each frequency orthogonal signal transmitted to a conductor or antenna. In an embodiment, the signal processor of the mixed signal integrated circuit (or a downstream component or software) performs a Fourier transform to received signals. In an embodiment, the mixed signal integrated circuit is adapted to digitize received signals. In an embodiment, the mixed signal integrated circuit (or a downstream component or software) is adapted to digitize received signals and perform a discrete Fourier transform (DFT) on the digitized information. In an embodiment, the mixed signal integrated circuit (or a downstream component or software) is adapted to digitize received signals and perform a Fast Fourier transform (FFT) on the digitized information—an FFT being one type of discrete Fourier transform.

It will be apparent to a person of skill in the art in view of this disclosure that a DFT, in essence, treats the sequence of digital samples (e.g., window) taken during a sampling period (e.g., integration period) as though it repeats. As a consequence, signals that are not center frequencies (i.e., not integer multiples of the reciprocal of the integration period (which reciprocal defines the minimum frequency spacing)), may have relatively nominal, but unintended consequence of contributing small values into other DFT bins. Thus, it will also be apparent to a person of skill in the art in view of this disclosure that the term orthogonal as used herein is not "violated" by such small contributions. In other words, as we use the term frequency orthogonal herein, two signals are considered frequency orthogonal if substantially all of the contribution of one signal to the DFT bins is made to different DFT bins than substantially all of the contribution of the other signal.

In an embodiment, received signals are sampled at at least 1 MHz. In an embodiment, received signals are sampled at at least 2 MHz. In an embodiment, received signals are sampled at 4 Mhz. In an embodiment, received signals are sampled at 4.096 Mhz. In an embodiment, received signals are sampled at more than 4 MHz.

To achieve kHz sampling, for example, 4096 samples may be taken at 4.096 MHz. In such an embodiment, the integration period is 1 millisecond, which per the constraint that the frequency spacing should be greater than or equal to the reciprocal of the integration period provides a minimum frequency spacing of 1 KHz. (It will be apparent to one of skill in the art in view of this disclosure that taking 4096 samples at e.g., 4 MHz would yield an integration period slightly longer than a millisecond, and not achieving kHz sampling, and a minimum frequency spacing of 976.5625 Hz.) In an embodiment, the frequency spacing is equal to the reciprocal of the integration period. In such an embodiment, the maximum frequency of a frequency-orthogonal signal range should be less than 2 MHz. In such an embodiment, the practical maximum frequency of a frequency-orthogonal signal range should be less than about 40% of the sampling rate, or about 1.6 MHz. In an embodiment, a DFT (which could be an FFT) is used to transform the digitized received signals into bins of information, each reflecting the frequency of a frequency-orthogonal signal transmitted which may have been transmitted by the transmit antenna 130. In an embodiment 2048 bins correspond to frequencies from 1 KHz to about 2 MHz. It will be apparent to a person of skill in the art in view of this disclosure that these examples are simply that, exemplary. Depending on the needs of a system, and subject to the constraints described above, the sample rate may be increased or decreased, the integration period may be adjusted, the frequency range may be adjusted, etc.

In an embodiment, a DFT (which can be an FFT) output comprises a bin for each frequency-orthogonal signal that is transmitted. In an embodiment, each DFT (which can be an FFT) bin comprises an in-phase (I) and quadrature (Q) component. In an embodiment, the sum of the squares of the I and Q components is used as measure corresponding to signal strength for that bin. In an embodiment, the square root of the sum of the squares of the I and Q components is used as measure corresponding to signal strength for that bin. It will be apparent to a person of skill in the art in view of this disclosure that a measure corresponding to the signal strength for a bin could be used as a measure related to biometric activity. In other words, the measure corresponding to signal strength in a given bin would change as a result of some activity.

FIG. 1 illustrates certain principles of a sensor 100 in accordance with an embodiment. Transmitter 200 transmits a different signal, generated by signal generator 202, into each of the row conductors 201 of the panel 400. The signals are designed to be "orthogonal", i.e., separable and distinguishable from each other. A receiver 300 is attached to each column conductor 301 and has operatively connected thereto a signal processor 302. The row conductors 201 and the column conductors 301 are conductors/antennas that are able to transmit and/or receive signals. The receiver 300 is designed to receive any of the transmitted signals, or an arbitrary combination of them, with or without other signals and/or noise, and to individually determine a measure, e.g., a quantity for each of the orthogonal transmitted signals present on that column conductor 301. The panel 400 of the sensor comprises a series of row conductors 201 and column conductors 301 (not all shown), along which the orthogonal signals can propagate. In an embodiment, the row conductors 201 and column conductors 301 are arranged such that a touch event will cause a change in coupling between at least one of the row conductors 201 and at least one of the column conductors 301. In an embodiment, a touch event will cause a change in the amount (e.g., magnitude) of a signal transmitted on a row conductor 201 that is detected in the column conductor 301. In an embodiment, a touch event will cause a change in the phase of a signal transmitted on a row conductor 201 that is detected on a column conductor 301. Because the sensor 100 ultimately detects a touch event due to a change in the coupling, it is not of specific importance, except for reasons that may otherwise be apparent to a particular embodiment, the type of change that is caused to the touch-related coupling by a touch. As discussed above, the touch, or touch event does not require a physical touching, but rather an event that affects the coupled signal. In an embodiment the touch or touch event does not require a physical touching, but rather an event that affects the coupled signal in a repeatable or predictable manner.

In various implementations of a touch device, physical contact with the row conductors 201 and/or column conductors 301 is unlikely or impossible as there may be a protective barrier between the row conductors 201 and/or column conductors 301 and the finger or other object of touch. Moreover, generally, the row conductors 201 and column conductors 301 themselves are not in physical contact with each other, but rather, placed in a proximity that allows signal to be coupled there-between, and that coupling changes with touch. Generally, the row conductor-column conductor coupling results not from actual contact between them, nor by actual contact from the finger or other object of touch, but rather, by the effect of bringing the finger (or other object) into proximity—which proximity results in a change of coupling, which effect is referred to herein as touch.

The nature of the row conductors 201 and column conductors 301 is arbitrary and the particular orientation is variable. Indeed, the terms row conductor 201 and column conductor 301 are not intended to refer to a square grid, but rather to a set of conductors upon which signal is transmitted (row conductors) and a set of conductors onto which signal may be coupled (column conductors). The notion that signals are transmitted on row conductors 201 and received on column conductors 301 itself is arbitrary, and signals could as easily be transmitted on conductors arbitrarily designated column conductors and received on conductors arbitrarily named row conductors, or both could arbitrarily be named something else. Further, it is not necessary that row conductors 201 and column conductors 301 be in a grid. Other shapes are possible as long as a touch event will affect a row conductor-column conductor coupling. For example, the "row" could be in concentric circles and the "columns" could be spokes radiating out from the center. And neither the "rows" nor the "columns" need to follow any geometric or spatial pattern, thus, for example, the keys on a keyboard could be arbitrarily connected to form row conductors 201 and column conductors 301 (related or unrelated to their relative positions). Moreover, an antenna may be used as a row conductor 201 (e.g., having a more defined shape than a simple conductor wire such as for example a row conductor made from ITO). For example an antenna may be round or rectangular, or have substantially any shape, or a shape that changes. An antenna used as a row conductor 201 may be oriented in proximity to one or more conductors, or one or more other antennas that act as column conductors 301. In other words, in an embodiment, an antenna may be used for signal transmission and oriented in proximity to one or more conductors, or one or more other antennas that are used to receive signals. A touch will change the coupling between the antenna used for signal transmission and the signal used to receive signals.

It is not necessary for there to be only two types of signal propagation channels: instead of row conductors 201 and column conductors 301, in an embodiment, channels "A", "B" and "C" may be provided, where signals transmitted on "A" could be received on "B" and "C", or, in an embodiment, signals transmitted on "A" and "B" could be received on "C". It is also possible that the signal propagation channels can alternate function, sometimes supporting transmitters and sometimes supporting receivers. It is also contemplated that the signal propagation channels can simultaneously support transmitters and receivers—provided that the signals transmitted are orthogonal, and thus separable, from the signals received. Three or more types of antenna or conductors may be used rather than just "rows" and "columns." Many alternative embodiments are possible and will be apparent to a person of skill in the art after considering this disclosure.

It is likewise not necessary for there to be only one signal transmitted on each transmitting media. In an embodiment, multiple orthogonal signals are transmitted on each row conductor. In an embodiment, multiple orthogonal signals are transmitted on each transmitting antenna.

The sensing apparatuses discussed herein use transmitting and receiving antennas (also referred to herein as conductors). However, it should be understood that whether the transmitting antennas or receiving antennas are functioning as a transmitter, a receiver, or both depends on context and the embodiment. In an embodiment, the transmitters and receivers for all or any combination of the patterns are operatively connected to a single integrated circuit capable of transmitting and receiving the required signals. In an embodiment, the transmitters and receivers are each operatively connected to a different integrated circuit capable of transmitting and receiving the required signals, respectively. In an embodiment, the transmitters and receivers for all or any combination of the patterns may be operatively connected to a group of integrated circuits, each capable of transmitting and receiving the required signals, and together sharing information necessary to such multiple IC configuration. In an embodiment, where the capacity of the integrated circuit (i.e., the number of transmit and receive channels) and the requirements of the patterns (i.e., the number of transmit and receive channels) permit, all of the transmitters and receivers for all of the multiple patterns used by a controller are operated by a common integrated circuit, or by a group of integrated circuits that have communications therebetween. In an embodiment, where the number of transmit or receive channels requires the use of multiple integrated circuits, the information from each circuit is combined in a separate system. In an embodiment, the separate system comprises a GPU and software for signal processing.

An aspect of the concepts and principles underlying the sensors is the process of infusion. As the term is used herein, infusion or injection refers to the process of transmitting signals to the body of a subject, effectively allowing the body (or parts of the body) to become an active transmitting source of the signal. In an embodiment, an electrical signal is injected into the hand (or other part of the body) and this signal can be detected by a sensor even when the hand (or fingers or other part of the body) are not in direct contact with the sensor's touch surface. To some degree, this allows the proximity and orientation of the hand (or finger or some other body part) to be determined, relative to a surface. In an embodiment, signals are carried (e.g., conducted) by the body, and depending on the frequencies involved, may be carried near the surface or below the surface as well. In an embodiment, frequencies of at least the KHz range may be used in frequency injection. In an embodiment, frequencies in the MHz range may be used in frequency injection. To use infusion in connection with FMT sensors as described above, in an embodiment, an infusion signal can be selected to be orthogonal to the drive signals, and thus it can be seen in addition to the other signals on the sense lines. In an embodiment, a signal is infused into a carrier (person, animal) and received infused signals are subsequently measured. In an embodiment, a plurality of unique frequency orthogonal signals are infused into a carrier and each of the infused plurality of unique frequency orthogonal signals received are measured.

The characteristics of signals infused into a person (or animal) or object can be impacted by the person or object. A person's body chemistry, size shape and other characteristics can impact the characteristics of the signal received at receivers and measured. Two different people can have a different amount of signal received. Two different people can impact characteristics of a signal received at receivers when the same orthogonal signal is infused into them. A variety of factors may impact the amount of signal that is measured. In an embodiment, machine learning is applied to measured signals and correlated with activities, movements, identities and conditions. The measured signals are used to determine information that can be ascertained about the person or object through which the signals traversed. In an embodiment, the measured signals are used to determine information that be ascertained about the state of the person. In an embodiment, the measured signals are used to determine information that can be ascertained about the health status of the person. In an embodiment, the measured signals are used to determine information that can be ascertained about the activity of the person. In an embodiment, the measured signals received at the receivers are used in order to identify the person or object that has the signal infused into them.

In an embodiment, a signal is transmitted into a person or object via a transmitting antenna (or conductor), at least some of the signal received at a receiving antenna (or conductor) is measured. In an embodiment, a signal is transmitted into a person or object via a transmitting antenna (or conductor), at least some of the signal is received at a plurality of receiving antennas (or conductors) and measured. In an embodiment, a signal is transmitted into a person or object via a plurality of transmitting antennas (or conductors), at least some of the signals transmitted are received at a receiving antenna (or conductors) and measured. In an embodiment, a plurality of orthogonal frequency signals are transmitted into a person or object via a transmitting antenna (or conductor), at least some of the transmitted signals are received at a receiving antenna (or conductor) and measured. In an embodiment, a plurality of unique orthogonal frequency signals are transmitted into a person or object via a plurality of transmitting antennas (or conductors), at least some of the signals transmitted are received at a plurality of receiving antennas (or conductors) and measured.

Figure 2:
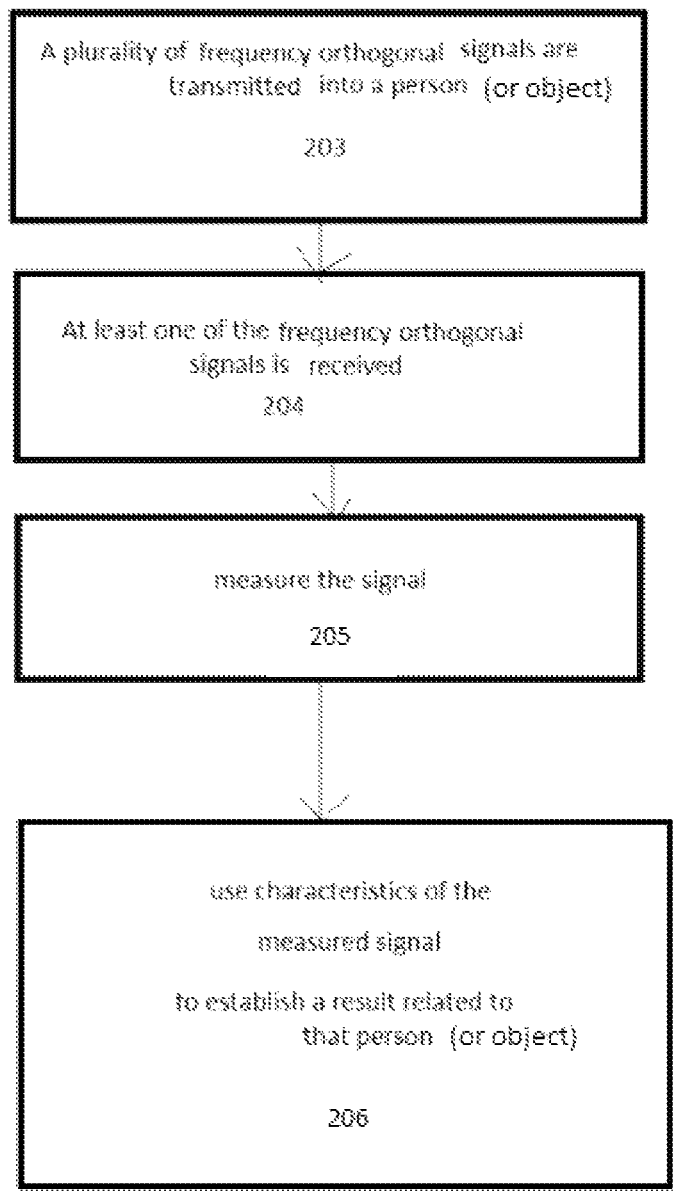
FIG. 2 is a flow chart showing the use of measurements from the system.

Turning to FIG. 2, a flow chart of an exemplary process for using signals that are transmitted into a person (or object) is shown. In step 203, a plurality of frequency orthogonal signals are transmitted into the person. The physical properties of the person (or object) impacts the plurality of frequency orthogonal signals as they pass through the person (or object). In an embodiment, the resistivity of a person's skin (or the resistivity of an object) impacts the plurality of frequency orthogonal signals as they pass through the person (or object). In an embodiment, the conductivity of a person's skin (or the conductivity of an object) impacts the plurality of frequency orthogonal signals as they pass through the person (or object). In an embodiment, the distance the signals traverse impacts the plurality of frequency orthogonal signals as they pass through the person (or object). In an embodiment, body chemistry impacts the plurality of frequency orthogonal signals as they pass through the person. In an embodiment, body temperature (or the temperature of an object) impacts the plurality of frequency orthogonal signals as they pass through the person (or object). In an embodiment, a person's heart rate impacts the plurality of frequency orthogonal signals as they pass through the person. In an embodiment, a person's pulmonary activity impacts the plurality of frequency orthogonal signals as they pass through the person. In an embodiment, a person's electrodermal activity (galvanic skin response) impacts the plurality of frequency orthogonal signals as they pass through the person. In an embodiment, more than one of the aforementioned items impacts the plurality of frequency orthogonal signals as they pass through a person (or object). In an embodiment, all of the aforementioned items impacts the plurality of frequency orthogonal signals as they pass through a person (or object). The aforementioned items impacting the plurality of frequency orthogonal signals as they traverse through a body or object means that in some instances information regarding those aforementioned signals may be determined from the signals.

In an embodiment, transmitting antennas (or conductors) are located on an individual. In an embodiment, transmitting antennas (or conductors) are located on an object. In an embodiment, transmitting antennas (or conductors) are located on an individual and an object. In an embodiment, receiving antennas (or conductors) are located on an individual. In an embodiment, receiving antennas (or conductors) are located on an object. In an embodiment, receiving antennas (or conductors) are located on an object and an individual.

In step 204, at least one of the frequency orthogonal signals is received at a receiver via a receiving antenna or conductor). In step 205, the signal that is received is measured. In an embodiment, the amount of signal that is received is measured. In an embodiment, the phase of the signal that is received is measured. In an embodiment, both the phase and the signal that is received is measured. The measurements for each of the received signals during a frame are compiled in order to form a heatmap.

In step 206, the measured signal or signals are used to establish a result related to a person. In practice, a plurality of the signals received are used to form a heatmap. For example, a plurality of frequency orthogonal signals are infused into an individual. At least one of each of the frequency orthogonal signals transmitted are received by a receiving antenna. The results are used to form a first heat map. Another plurality of frequency orthogonal signals having the same profile (i.e. each of the same frequencies are transmitted) are infused into another individual. At least one of each of the frequency orthogonal signals are received and used to form a second heat map. Comparison of the first heat map with the second heat map will result in a different heatmap. The different heatmaps can then be used to establish an identification of each of the individuals. Similarly this can be used with objects as well and the identity of the object may be established.

In an embodiment, the result is the identity of a person. In an embodiment, the result is the identity of an object. In an embodiment, the result is the identity of an object or person. In an embodiment, the result is a biometric related to the person. In an embodiment, the result is information related to a person's diet. In an embodiment, the result is information related to a person's physical activity. In an embodiment, the result is information related to a person's age. In an embodiment, the result is information related to a person's weight. In an embodiment, the result is related to a person's state of mind (e.g., agitated, calm). In an embodiment, the result is information related to a person's height. In an embodiment, the result is more than one of the aforementioned results. In an embodiment, the result is all of the aforementioned results.

As discussed above, the measured results can be used with machine learning in order to correlate the results of measurements to the specific results. By factoring together different results, information can be provided regarding a person and/or activity of the person. The resulting information can be used in order to produce any number of results in a given environment.

Figure 3:
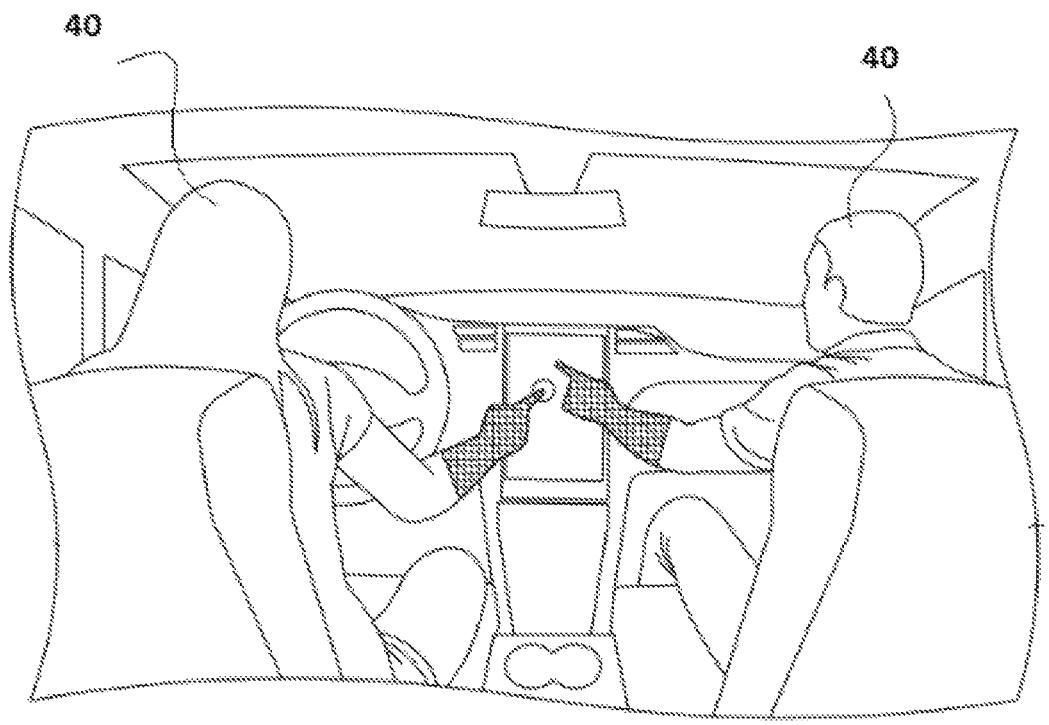
FIG. 3 is a depiction of people in an environment where signal is infused.

Referring now to FIG. 3, shown is an exemplary embodiment of an implementation of using the characteristics of measured signal. In an embodiment, sensors (not shown) having transmitting conductors and/or receiving conductors can be located within and/or on the seat. In an embodiment, an infusion transmitting conductor can be located within and/or near the seat. In an embodiment, receiving conductors are located within and/or near the seat. In an embodiment, the user holds or wears an object separate from the vehicle wherein that object is able to transmit a unique orthogonal signal or signals through a person. In an embodiment, the user has a unique orthogonal signal or signals infused via one of the components of the vehicle. In an embodiment, signal or signals are infused into the user via the steering wheel. In an embodiment, signal or signals are infused into a user via the dashboard. In an embodiment, signal or signals are transmitted into the user via an interior portion of the vehicle. In an embodiment, signal or signals are transmitted into the user via an exterior portion of the vehicle. In an embodiment, signals are transmitted into an object via a conductor (or antenna) and are received at a conductor or antenna located elsewhere.

Shading of the passengers 40 illustratively indicates the presence of an infused signal within the passengers 40. Measurements of received signals are able to be used to establish a result related to that person. In an embodiment, the result related to that person is an identity of the person based on the characteristics of the measured signal. In this situation the vehicle would be able to distinguish the identity of the individual who is operating certain features of the vehicle and adapt accordingly.

In an embodiment, the identity of the person provides access to the instruments located on the vehicle's dashboard or throughout the vehicle. For example, there may be a blank display and identification of the individual can be used to display a certain arrangement of controls and heads-up displays that are unique to that individual. In an embodiment, the identity of the person is used to start the car. In an embodiment, the identity of the person based on the measured signal is used to activate the lights in the car. In an embodiment, the identity of the person based on the measured signal is used to adjust the seats in the car to settings preferred by that person. In an embodiment, the identity of the person based on the measured signal is used to modify the temperature of the car based on the preferences of the individual. In an embodiment, the identity of the person based on the measured signal is used to modify the temperature of the car based on a physical state of the person. In an embodiment, the identity of the person based on the measured signal is used to adjust an interior feature of the car. In an embodiment, the identity of the person based on the measured signal is used to adjust an exterior feature of the car. In an embodiment, various settings are enabled or disabled based upon the signal transmitted by the passenger and the identity that is determined based upon the measured characteristics of the signal. In an embodiment, controls are enabled or disabled based upon the signal transmitted by the passenger and the identity that is determined based upon the measured signal.

In an embodiment, the measured signals are correlated with established baseline measurements of signals. The newly established measured signals are then used to provide a new result. In an embodiment, the result related to the person is that the person is impaired by a substance. In an embodiment, the result related to the person is that the person is subject to an ailment. In an embodiment, the result related to the person is that the person is subject to an injury. The results then can be provided to the individual. In an embodiment, the results can be used to cease or never start the functioning of a vehicle. In an embodiment, the results could indicate a heart condition issue and medical attention could be sought. In an embodiment, the results could indicate an illness such as the flu and medical attention could be recommended.

In a household setting, signal may be infused into a person using a wearable or other household objects. In an embodiment, a door handle is adapted to infuse a signal into a user. In an embodiment, a portion of the door is adapted to infuse a signal in a user. The infused signal is received by receiving conductors (or antennas) sent to a receiver and ultimately measured and processed. The receiving conductors (or antennas) may be located in the door or elsewhere. In an embodiment, the results of the measured signal information can be used to establish the identity of a person. In an embodiment, the identity of the person based on the measured signal is used to enter a home. In an embodiment, the identity of the person based on the characteristics of the measured signal is used to operate features of the interior of the home. In embodiment, the identity of the person based on the characteristics of the measured signal is used to operate exterior features of the home.

Furthermore, the identity of the person based on the characteristics of the measured signal is used when interacting with displays and other CPU enabled objects. In an embodiment, the identity of the person based on the characteristics of the measured signal is used to recognize when a past user is operating a display or computer. In an embodiment, the identities of multiple people based on characteristics of the measured signal is used when interacting with displays and other CPU enabled objects.

Additionally, the signature of the signal that has been infused can be used to discriminate between different types of objects and biological beings. The signature of the signal that has been infused may be different for a car seat versus a person. A watermelon will also end up having a different signature than a person. Similarly different materials such as metal, wood, plastics and ceramics, will have different signals with respect to each other. Each type of metal (or wood, plastic, ceramic, etc.) may have a signature. In an embodiment, the infused signal can be used to determine if there is an object or a person in a car. In an embodiment, the infused signal can be used to determine if there is an object or a person in a seat. In an embodiment, the infused signal can be used to determine if there is an object or a person in a room.

An aspect of the disclosure is a sensing system for providing identity or a condition of a person. The sensing system has a transmitter adapted to transmit a plurality of unique frequency orthogonal signals; a plurality of transmitting conductors, each of the plurality of transmitting conductors operably connected to the transmitter, wherein a plurality of unique frequency orthogonal signals are transmitted through the plurality of transmitting conductors, wherein at least one of the plurality of unique frequency orthogonal signals is adapted to be transmitted into a person; a plurality of receiving conductors, each of the plurality of receiving conductors operatively connected to a receiver adapted to receive the at least one of the plurality of unique frequency orthogonal signals adapted to be transmitted into the person; and a signal processor adapted to process a measurement of the at least one of the plurality of unique frequency orthogonal signals adapted to be transmitted into the person, wherein the processed measurement provides information regarding identity or a condition of the person.

Another aspect of the disclosure is a sensing system for establishing the identity of a person or an object. The sensing system has a first antenna; a signal generator operatively connected to the first antenna, the signal generator being configured to transmit a plurality of frequency orthogonal signals on the first antenna; a plurality of second antennas adapted to receive signals transmitted by the first antenna; a signal processor operatively connected to the second antenna, the signal processor being configured to process each of the plurality of frequency orthogonal signals received and form a heatmap; and wherein the heatmap is used to establish identity of a person or object.

Still yet another aspect of the disclosure is a method a method of identifying a person or object. The method comprising: transmitting signals on a first antenna, the first antenna configured to transmit at least one signal into the person or object; receiving signals on at least one of a plurality of second antennas; processing signals on a signal processor operatively connected to the plurality of second antennas, the signal processor being configured to process a signal received on each of the second antennas, and for each of the second antennas to determine a measurement corresponding to the transmitted signals; and determining an identity of the person or object using measurements corresponding to the transmitted signals.

While the invention has been particularly shown and described with reference to a preferred embodiment thereof, it will be understood by those skilled in the art that various changes in form and details may be made therein without departing from the spirit and scope of the invention.

The invention claimed is:

1. A sensing system comprising:
   a transmitter adapted to transmit a plurality of unique frequency orthogonal signals;
   a plurality of transmitting conductors operably connected to a seat of a vehicle, each of the plurality of transmitting conductors operably connected to the transmitter, wherein a plurality of unique frequency orthogonal signals are transmitted through the plurality of transmitting conductors, wherein at least one of the plurality of unique frequency orthogonal signals is adapted to be transmitted into a person;
   a plurality of receiving conductors operably connected to the seat of the vehicle, each of the plurality of receiving conductors operatively connected to a receiver adapted to receive the at least one of the plurality of unique frequency orthogonal signals adapted to be transmitted into the person; and
   a signal processor adapted to process a measurement of the at least one of the plurality of unique frequency orthogonal signals adapted to be transmitted into the person from the seat of the vehicle, wherein the processed measurement provides information regarding identity or a condition of the person.

2. The sensing system of claim 1, wherein the measurement is modified by skin resistivity.

3. The sensing system of claim 1, wherein the measurement is related to an amount of signal.

4. The sensing system of claim 1, wherein the measurement is related to phase of a signal.

5. The sensing system of claim 1, wherein the signal processor is adapted to use machine learning to establish an identity of the person.

6. The sensing system of claim 1, wherein more than one of the plurality of unique frequency orthogonal signals are transmitted into the person.

7. The sensing system of claim 1, wherein the processed measurements provide information regarding an object.

8. A sensing system:
   a first antenna operably connected to a seat of a vehicle and adapted to transmit signals into a person or object located in the seat;
   a signal generator operatively connected to the first antenna, the signal generator being configured to transmit a plurality of frequency orthogonal signals on the first antenna;
   a plurality of second antennas adapted to receive signals transmitted by the first antenna, wherein the plurality of second antennas are operably connected to the seat of the vehicle;
   a signal processor operatively connected to the second antenna, the signal processor being configured to process each of the plurality of frequency orthogonal signals received and form a heatmap; and
   wherein the heatmap is used to establish identity of a person or object.

9. The sensing system of claim 8, wherein the first antenna is one of a plurality of first antennas.

10. The sensing system of claim 8, further comprising a first component configured to be worn by a subject and adapted to maintain the first antenna in proximity to the subject when the first component is worn.

11. The sensing system of claim 8, wherein the transmitting antenna is formed part of a door.

12. The sensing system of claim 8, wherein the measurement is modified by skin resistivity.

13. The sensing system of claim 8, wherein the measurement is related to an amount of signal.

14. The sensing system of claim 8, wherein the measurement is related to phase of a signal.

15. The sensing system of claim 8, wherein the signal processor is adapted to use machine learning to establish identity of the person or object.

16. The sensing system of claim 8, wherein more than one of the plurality of unique frequency orthogonal signals is transmitted into the person or object.

17. A method of identifying a person or object comprising:
   transmitting signals on a first antenna, wherein the first antenna is operably connected to a seat of a vehicle, the first antenna configured to transmit at least one signal into the person or object;
   receiving signals on at least one of a plurality of second antennas;
   processing signals on a signal processor operatively connected to the plurality of second antennas, wherein the plurality of second antennas are operably connected to the seat of the vehicle, the signal processor being configured to process a signal received on each of the second antennas, and for each of the second antennas to determine a measurement corresponding to the transmitted signals; and
   determining an identity of the person or object using measurements corresponding to the transmitted signals.

18. The method of claim 17, wherein determining an identity of the person comprises comparing a heat map established from an individual with a heat map established from another individual.

* * * * *